United States Patent
Eilam et al.

(10) Patent No.: US 7,676,552 B2
(45) Date of Patent: Mar. 9, 2010

(54) AUTOMATIC PROVISIONING OF SERVICES BASED ON A HIGH LEVEL DESCRIPTION AND AN INFRASTRUCTURE DESCRIPTION

(75) Inventors: Tamar Eilam, New York, NY (US); Liana L. Fong, Irvington, NY (US); Guerney D. H. Hunt, Yorktown Heights, NY (US); Michael H. Kalantar, Millwood, NY (US); Lily B. Mummert, Mahopac, NY (US); John A. Pershing, Jr., Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 10/776,297

(22) Filed: Feb. 11, 2004

(65) Prior Publication Data

US 2005/0198244 A1    Sep. 8, 2005

(51) Int. Cl.
G06F 15/16    (2006.01)
(52) U.S. Cl. .................... 709/218; 455/445; 379/242; 709/226; 709/232
(58) Field of Classification Search .................... 709/226
See application file for complete search history.

(56) References Cited

U.S. PATENT DOCUMENTS

| | | | |
|---|---|---|---|
| 6,332,023 B1 * | 12/2001 | Porter et al. | 379/242 |
| 6,768,901 B1 * | 7/2004 | Osborn et al. | 455/230 |
| 6,901,446 B2 * | 5/2005 | Chellis et al. | 709/226 |
| 7,050,807 B1 * | 5/2006 | Osborn | 455/445 |
| 2003/0208473 A1 * | 11/2003 | Lennon | 707/3 |
| 2004/0039772 A1 * | 2/2004 | De Miguel et al. | 709/201 |
| 2004/0088417 A1 * | 5/2004 | Bober et al. | 709/227 |
| 2004/0128397 A1 * | 7/2004 | Glasmann et al. | 709/232 |
| 2004/0177245 A1 * | 9/2004 | Murphy | 713/100 |
| 2004/0243613 A1 * | 12/2004 | Pourheidari | 707/102 |
| 2004/0243699 A1 * | 12/2004 | Koclanes et al. | 709/224 |

* cited by examiner

*Primary Examiner*—Vivek Srivastava
*Assistant Examiner*—Vivek Krishnan
(74) *Attorney, Agent, or Firm*—Michael J. Buchenhorner; Vazken Alexanian

(57) ABSTRACT

The present invention is directed to provisioning and managing computing services in a computing utility system. It receives as an input an infrastructure independent description of a set of requirements on the new desired state of a computing service. It uses a knowledge plane to represent the infrastructure. The method generates a Concrete Model that describes a resource structure that refines the input and is implementable over the infrastructure. It then generates and possibly executes provisioning actions to create an identical resource structure on the infrastructure. The method can be used to create new computing services, to destroy existing computing services, to modify the resource combinations allocated to a computing service, or the configuration of these resources. Provisioning actions can be executed immediately, or saved and executed later, and possibly many times. Provisioning actions may be regenerated using the method whenever infrastructure characteristics, or the service requirements change.

23 Claims, 13 Drawing Sheets

AUTOMATIC PROVISIONING OF SERVICES BASED ON A HIGH LEVEL DESCRIPTION AND AN INFRASTRUCTURE DESCRIPTION

CROSS REFERENCES

The present application is cross-referenced to application Ser. No. 10/776,705 entitled ".Automatic Provisioning of Services Based on Declarative Descriptions Of The Resource Structure Of The Service," even dated herewith, and which is included herein by reference in entirety for all purposes.

FIELD OF THE INVENTION

The present invention is directed to provisioning and managing computing services in a computing utility system, based on high level description of the characteristics and structure of the desired computing services and a representation of the computing utility infrastructure used as a platform to implement the aforementioned services.

BACKGROUND

The cost and complexity of managing IT infrastructure continues to grow rapidly. Several factors contribute to this trend. First, IT infrastructures today are based on a distributed network of heterogeneous platforms and applications. In such an environment, resources, their capabilities, and behavior, are represented differently. They are therefore harder to compare and reason about. Interdependencies between resources, in which one resource's behavior is affected by another one, are not well represented or understood. Administrative personnel need to exercise knowledge of every platform, application and network appliance used, as well as of how they can be assembled together for a particular purpose.

Second, in a highly competitive business environment, businesses must respond quickly to market changes. Such changes may impose new requirements on the IT infrastructure, such as supporting new computing services or applications, upgrading resources, incorporating new ones, or changing the network structure. Realizing these changes is often a manual, tedious, and error prone process. In particular, as configuration changes are made, new IT management processes need to be defined, and existing processes may need to be updated.

Finally, service providers are moving towards an SLA-based service delivery model in which the set of resources allocated to a customer is dynamically adjusted based on workload and performance. Reconfiguring infrastructure resources dynamically in response to customer needs demands prompt attention from administrative personnel increasing operational cost. Therefore, a clear requirement of businesses today is to reduce the cost of maintaining an IT infrastructure by reducing the overall complexity and the level of required human operation.

A common approach to addressing these challenges is incorporating automation into the operation of the system. Common tasks such as adding a server to a computing service when the load increases, or installing software on a server, are automated, thereby reducing human involvement, the time to complete the task, and the probability for human errors. Workflows are often used as a vehicle for automation because they are particularly well suited for coordinating the execution of a set of activities that are long lived, tracking progress of activities, and incorporating human interaction where necessary. Provisioning engines, including a workflow engine, and some useful set of workflows organized in some structured way, are emerging as a means to achieve the goal of reducing the cost through automation.

Automating the operation of the infrastructure, even by utilizing a provisioning engine, does not fully address the aforementioned challenges. Automation procedures are often specific to a particular infrastructure, computing environment, and service. When coding an automation procedure it is impossible to predict all future changes in the service or infrastructure. Therefore statically defined automation procedures are likely to require change. For example, changing from a one-tier to a two-tier architecture, or adding resources with new capabilities, can require a complex re-implementation of the automation procedures. This task is further complicated by the many interdependencies between resources that are often implicit, by the combinatorial large number of possible allocations and configurations of a given set of resources, by the variety of possible computing services with different requirements, and by the many and rapidly evolving types of hardware and software resources. Therefore there is a need to be able to describe a computing service independent of a particular infrastructure, to describe the resources in a service provider's infrastructure and their interdependencies, and to automatically generate the instructions to provision and manage the service on the resources in the infrastructure.

SUMMARY OF THE INVENTION

Thus, this invention provides a process for performing provisioning given a high level description of the desired computing service characteristics and requirements, independent of the infrastructure, and a separate description of the infrastructure elements. A method is provided which determines how to assemble the desired service environment from the building blocks available in the infrastructure, or how to change the composition of resources allocated to an existing service environment to meet new requirements. Automatic generation of provisioning instruction facilitates consistent implementations, and reduces error. The instructions could be embodied in a form such as a workflow that would serve as input to a provisioning engine.

The method is comprised of two distinct steps. In the first step, a Concrete Model is generated from a Service Environment Model and an Infrastructure Model. The Service Environment Model is a description of the characteristics of the desired service, independent of the infrastructure. The Infrastructure Model encapsulates knowledge on elements of the infrastructure, including resource instances, resource types, resource configuration, capabilities and constraints. The Concrete Model satisfies two important properties. First, it is implementable over the infrastructure. In other words, it can be created using infrastructure elements. Second, as a refinement of the Service Environment Model, an implementation of the Concrete Model also satisfies the requirements and characteristics described in the Service Environment Model.

The second step of the method comprises processing a given Concrete Model to generate provisioning instructions such that a resource structure that matches the description in the Concrete Model can be created in the infrastructure by executing the provisioning instructions.

The method can be used to perform provisioning, including creating a new service environment, destroying an existing one, modifying the combination of resources allocated to a computing environment, modifying their configuration, or any combination of the above.

In an example embodiment, a method comprises generating a Concrete Model. The Concrete Model describes a structure of resources implementable over a computing utility infrastructure, and satisfying a set of service requirements, said step of generating comprising the steps of: obtaining a Service Environment Model of a service environment, said Service Environment Model describing a new desired state of said service environment; getting an Infrastructure Model describing both resources and an organization of the resources in the computing utility infrastructure, said Infrastructure Model is encapsulated in a knowledge subsystem; and forming the Concrete Model describing a resource structure such that said Concrete Model refines the Service Environment Model and is mappable to said knowledge subsystem.

In an example embodiment, a method further comprising employing said Concrete Model to generate provisioning actions, said provisioning actions, when executed, create a resource structure that matches the description in the Concrete Model, said resource structure satisfies said new desired state of said service environment.

In some embodiments, the method includes employing the Concrete Model to generate a resource manager that manages a collection of composite resources.

BRIEF DESCRIPTION OF THE DRAWINGS

The foregoing and other objects, aspects and advantages will be better understood from the following detailed description of a preferred embodiment of the invention with reference to the drawings, in which.

DEFINITION OF TERMS

Figure 1:
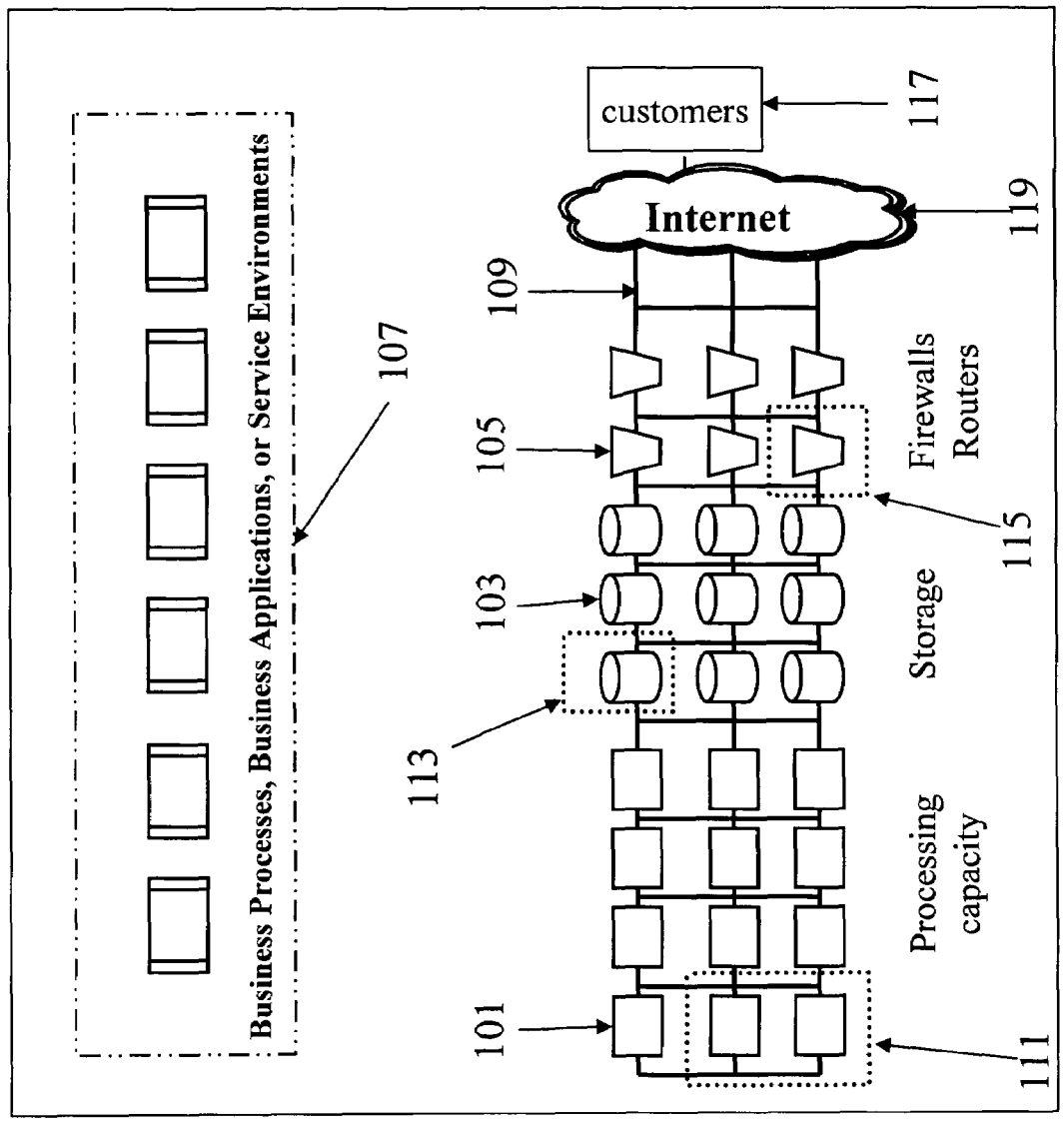
FIG. 1 The system in which the invention is used.

A service environment (SE) supports a computing service offered to a single customer. It includes hardware and software resources such as servers, operating systems, and middleware configured to provide the required service A service provider manages multiple service environments. A service provider employs a set of resources that may be used to provision and maintain service environments. A service provider is expected to be a prime user of the present invention.

A computing utility is the system that is used in order to provide computing services to customer, including infrastructure resources and management software. The present invention is a component of a computing utility.

A computing utility infrastructure is the set of resources that are used by a computing utility system, including resources allocated to service environments (e.g., servers), and supporting resources (e.g., network elements).

A Service Environment Model is a description, using a formal language, e.g. XML, of a desired structure and state of a set of resources. This description is a high level description which may be implemented in multiple ways in different infrastructures, namely, it is infrastructure independent.

A Concrete Model is a description, using a formal language, e.g., XML, of a resource structure. It includes description of a set of resources, including constraints on values of their attributes, and a set of relationships between these resources.

A knowledge subsystem is a set of objects that are used to represent resource instances and relationships, configure resources and relationships (including life cycle operations), query their state, and query their configuration capabilities. The knowledge subsystem encapsulates knowledge of the current state of the computing utility infrastructure, and constraints and capabilities including policy based best practices defined by a service provider.

An Infrastructure Model is the knowledge encapsulated by the knowledge subsystem.

A base resource is a resource that is atomic; it cannot be broken down into other resources. Any resource that a service provider does not want to subdivide can be treated as a base resource. Adding, removing, or modifying a base resource changes the overall capacity of the system. We assume that both the number and types of the base resources change over time. The notion of base resource is service provider specific. Resources may be physical resources such as servers and switch ports, logical resources such as server groups, IP addresses, and software licenses, or virtual resources such as virtual servers or virtual local area networks (VLANs).

A composite resource is built out of other resources. A composite resource may have an associated set of relationships between its constituent resources. An example of a composite resource is a Web site. It may be composed of some number of front-end servers, back end servers, a load balancer, a set of IP addresses for the servers, Web server software, database software, and licenses associated with the software. The set of base resources used to implement the function of a composite resource can change over time, though not all composite resources may have this capability.

Provisioning refers to any task of creating, allocating, removing or configuring base or composite resources in an existing or a new service environment. Provisioning actions may involve assembling base resources into composites, configuring network devices, installing operating systems, application software, monitors, user accounts, and so on. Since a service environment is modeled as a composite resource, provisioning also refers to the act of setting up a new service environment, modifying it, or destroying it.

DESCRIPTION OF THE INVENTION

The invention provides a method for generating provisioning actions given a description of the desired computing service characteristics and a separate description of the infrastructure elements. It determines how to assemble the desired service environment from the building blocks available in the infrastructure, or how to change the composition of resources allocated to an existing service environment to meet new requirements. The provisioning actions that are generated can be embodied in a form such as a workflow that would serve as input to a provisioning engine.

The environment in which the present invention operates may possess any of the characteristics listed below. Although the present invention is not dependent on these characteristics, the method is general enough to handle such conditions and characteristics.

First, resources may be allocated to customers in combinations which are heterogeneous, may be interdependent, and vary over time.

Second, the service environments provided to each customer may be different. For example, one customer may be provided resources for a web site, and another for a scientific computing cluster. Resource types, quantities, dependencies, and allocation patterns will thus vary between customers.

Third, there can be multiple ways to construct a service environment from the resources in a service provider's infrastructure. A customer may have preferences or requirements for particular variations of a given service environment. A service provider may also have operational constraints that dictate which variations are acceptable.

Fourth, the infrastructure varies between service providers. Further, for a given service provider, the infrastructure varies over time. These variations can be a result of upgrades or additions to the physical infrastructure.

The system in which the present invention is used is a distributed computer system which has multiple computing resources interconnected via a network. A diagram of such a system, which might be found in a hosting or data center, is shown in FIG. 1. The computing resources in the physical infrastructure include, but are not limited to, processors 101, storage 103, firewalls 105, and software 107. The software can be operating systems, middleware or applications. In FIG. 1 the available software has been preconfigured into Business Processes, Business Applications, or Service Environments 107. The hardware resources are connected by a network 109 as indicated by the grid of lines interconnecting all of these resources. This network may be configure into one or more tiers, where each tier is separated by a router or firewall. Software resources are assigned to physical resources by a management infrastructure. In this environment a subset of the resources are assigned to the management infrastructure. In FIG. 1 these resources 111, 113, and 115 are indicated by a dotted line surrounding them. The resources assigned to the management infrastructure run the management software described in this invention. This software manages the rest of the resources. The resources used for the management infrastructure are not assigned to customers of the hosted environment. The remaining resources are assigned to customers as necessary. It is expected that customers 117 will primarily receive service by connecting to their resources through the Internet 119. However, customers can receive service if they are connected to their resources by any means, such as through a direct connection to a managed resource.

Figure 2:
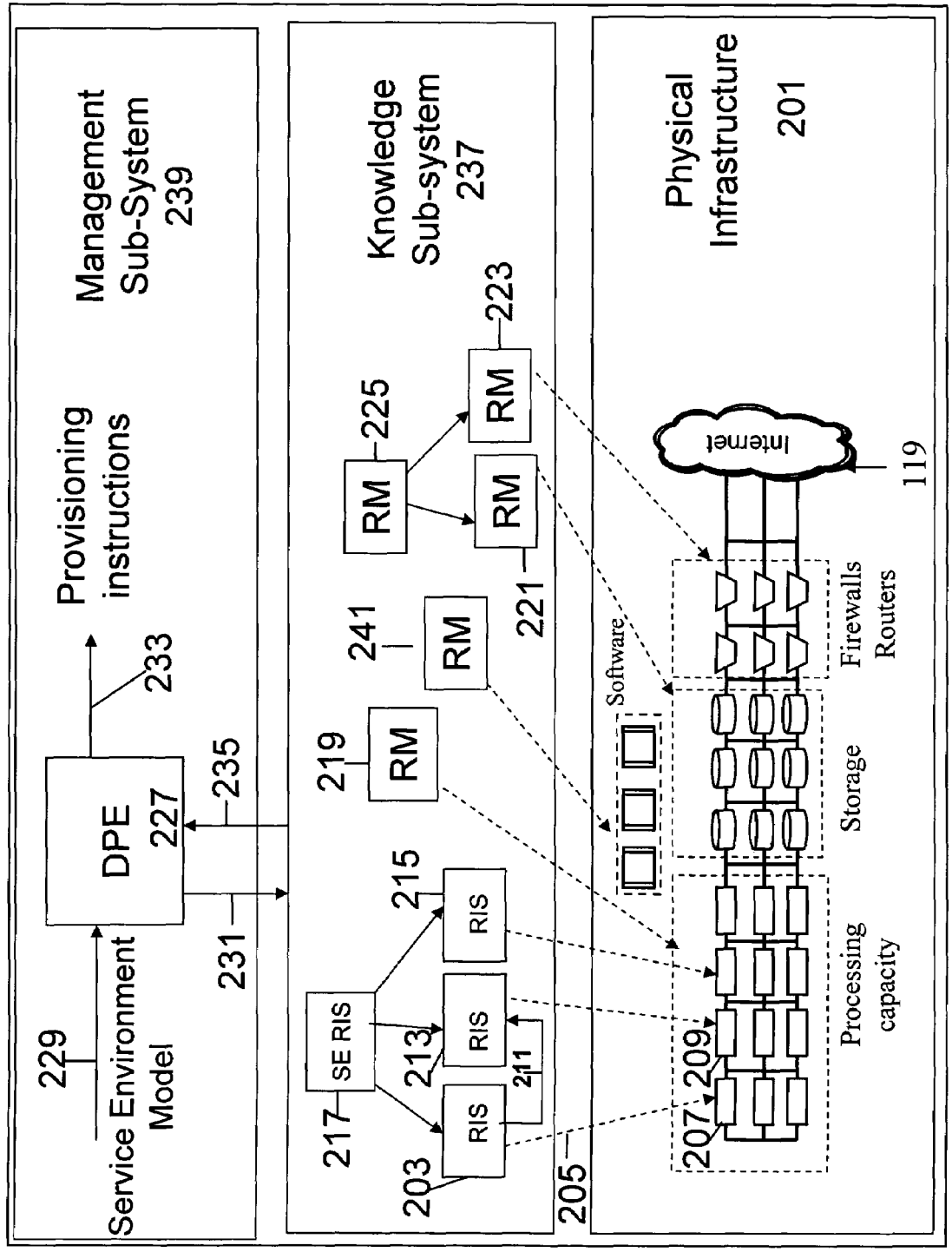
FIG. 2 High level view of the management elements that are described in this invention.

FIG. 2 is a high level view of the elements that are described in this invention. They can be divided into three groups. The physical infrastructure 201 is the actual set of interrelated resources as described in FIG. 1. The knowledge subsystem 237 contains a set of management entities that represent and control the resources. In particular, every resource is represented and controlled by a service with some canonical interfaces, termed a Resource Instance Service (RIS). RIS 203 in the figure represents resource 207 as indicated by the dashed arrow 205 connecting them. Relationships and dependencies between resources in the physical infrastructure are represented, in the knowledge subsystem, by a canonical set of relationships between the corresponding RISs. The relationship 211 between RISs 203 and 213 indicates an interdependency between the corresponding resources 207 and 209. The nature of this interdependency is indicated by data associated with the relationship, such as its type, not shown in the figure. Composite resources can also be represented and controlled by a RIS. For example, RIS 217 represents a composite resource which is a service environment (SE). A relationship of type federates connects RIS 217 with the three RISs 203, 213, and 215, as the arrows indicate. This relationship means that the three corresponding resources in the physical infrastructure are allocated to the service environment that RIS 217 represents. Resource Managers (RMs) represent and manage collections of resources of the same type. In particular, they provide an operation that returns a handle to a free resource instance. RM 219 manages the set of processing capacity resources. RMs 221, 223, and 241 manage the collections of storage firewall, and software licenses resources, respectively. A composite resource type may also have an RM that encapsulates the knowledge of how to build the composite resource from other resources. An RM for a composite resource may use the RMs of the resources that comprise the composite resource. For example, in the figure, RM 225 is an RM for a secure storage composite resource; it uses RMs 221 and 223, as the arrows indicate. Together, RMs and RISs encapsulate knowledge of resource capabilities, how resources can be changed, how they can be associated with other resources, and what resources are currently free or allocated. In managing resources, RMs and RISs implement methods that affect changes on the resources they manage. These methods may be implemented in any way such as by scripts or by a provisioning engine.

The management subsystem 239 contains a dynamic provisioning engine (DPE) 227 which receives requests in the form of a Service Environment Model that describe a desired state, or a set of requirements on the state of a set of resources, or a service environment. The DPE generates provisioning actions 233 for reaching a state that satisfies the requirements specified in the Service Environment Model. Once these provisioning actions are executed, either by the DPE, or by the DPE using a provisioning engine, they affect the state of the system. For example, a request may describe requirements on a new service environment, or requirements on an existing service environment. Processing of a request results in provisioning actions that change the combination of resources allocated to a service environment. To generate the provisioning actions the DPE queries the knowledge subsystem, as indicated by arrow 235, to understand the state of the system and how it can be changed. The DPE generates provisioning actions that contain invocations of operations on knowledge subsystem entities, thus execution of a sequence of provisioning actions affects the state of the system (resources in the physical infrastructure), only through interaction with the knowledge subsystem (arrow 231), and not directly. The generation and execution of provisioning actions may be interleaved; to serve a request, a sequence of provisioning actions may be generated and executed before the next sequence is generated; sequences of provisioning actions may be regenerated if its execution fails.

The focus of the invention is the process employed by the DPE in order to generate and execute sequences of provisioning actions to create, destroy, or change the state of service environments, or any combination of resources, given a high level description of the newly desired state. By a state of a service environment we mean the combination of resources allocated to it, and their configuration. Using the process, a sequence of provisioning actions to create, destroy or change resource structure of a composite resource can be generated and executed automatically and dynamically.

It is important to note that the same method can be applied inside a RM for a composite resource. Thus, the method can be applied to automatically generate a RM for a composite resource type based on its definition using a Concrete Model. The generated RM provides a set of methods to create, destroy, or modify a composite resource based on a Concrete Model that describes its desired structure. The RM can be then used as any other RM by a higher level DPE. Such a strategy distributes the DPE method across infrastructure entities. It also enables creation and re-use of provisioning components in different levels of granularity.

Figure 3:
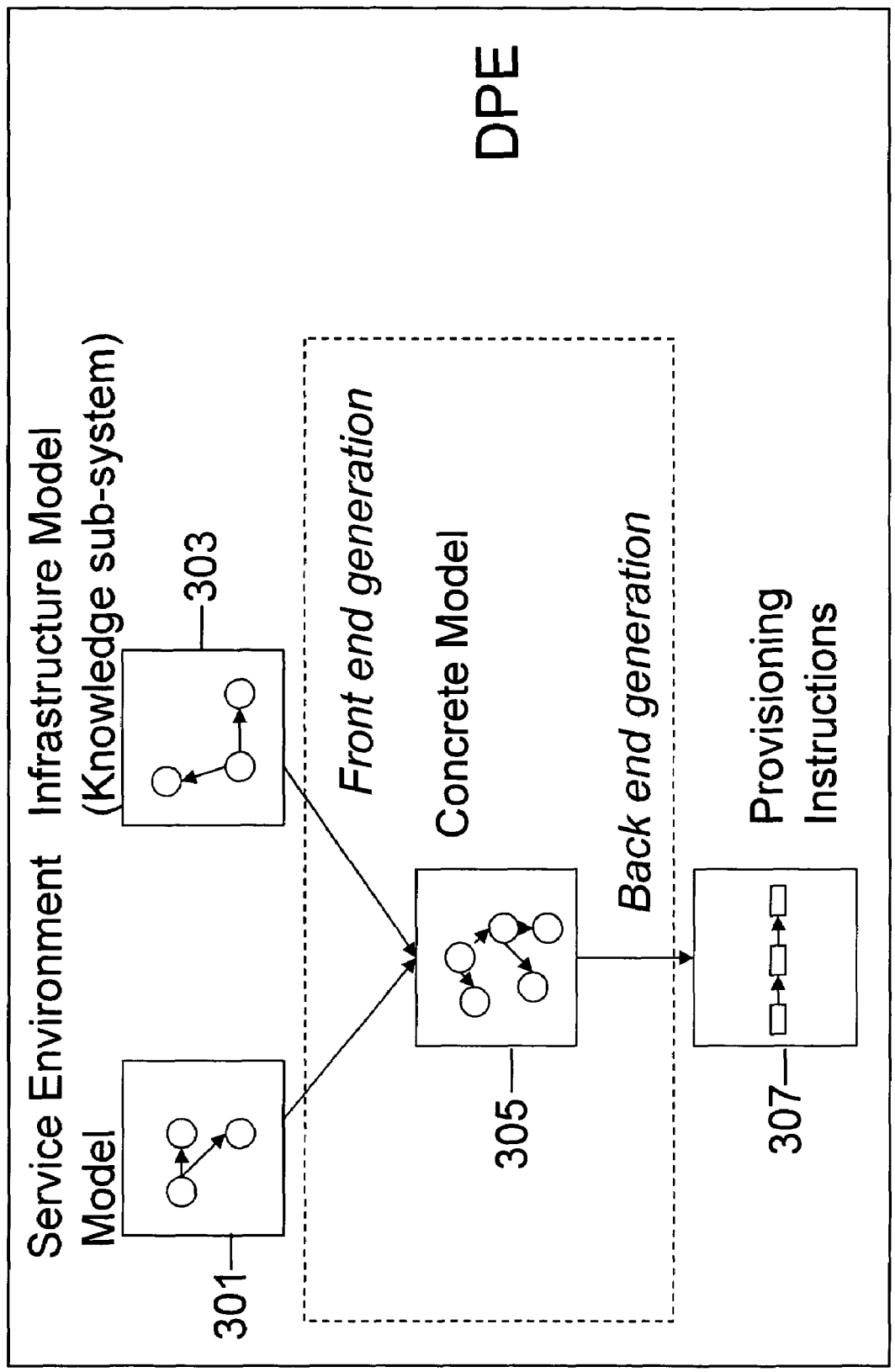
FIG. 3 High level view of process to generate provisioning instructions.

FIG. 3 shows a high level view of the two stage process of this invention as it would be employed in the DPE. The input to the process is (1) a Service Environment (SE) Model, describing a set of requirements and, (2) a description 303, termed Infrastructure Model, of the computing utility infrastructure. The Infrastructure Model represents knowledge on infrastructure resources, their constraints and capabilities. This knowledge is encapsulated in the knowledge subsystem. The DPE may need to query the knowledge subsystem in order to obtain the parts of the Infrastructure Model that are necessary for its function.

The process includes two main steps. In the first step, termed Front End Generation, the Service Environment Model is combined with the Infrastructure Model to form a Concrete Service Model 305. The Concrete Model declaratively describes the structure that needs to be created on the infrastructure in order to reach a state where all of the requirements expressed in the Service Environment Model are satisfied. The second step, termed Back End Generation, receives as an input the Concrete Model and generates and executes provisioning actions for its construction 307.

The Models

The invention is based on the observation that services environments can be implemented in different ways depending on the infrastructure at hand. For example, a Web Site service environment may be implemented using a one- or two-tiered network architecture, using firewalls or VLANs to implement security, and, Apache or Web Sphere as a Web server. The person who defines requirements and properties of the service environment that needs to be created may not have the infrastructure expertise, or even the knowledge of which infrastructure is going to be used. Therefore, a clear requirement is to separate the Service Environment Model, which describes requirements on service environments, from the Infrastructure Model, which describes an infrastructure, the available resources and how they are related, or can be related to each other. Hereafter, we describe the examples of the various models that can be used in this invention.

The Service Environment (SE) Model

Figure 4:
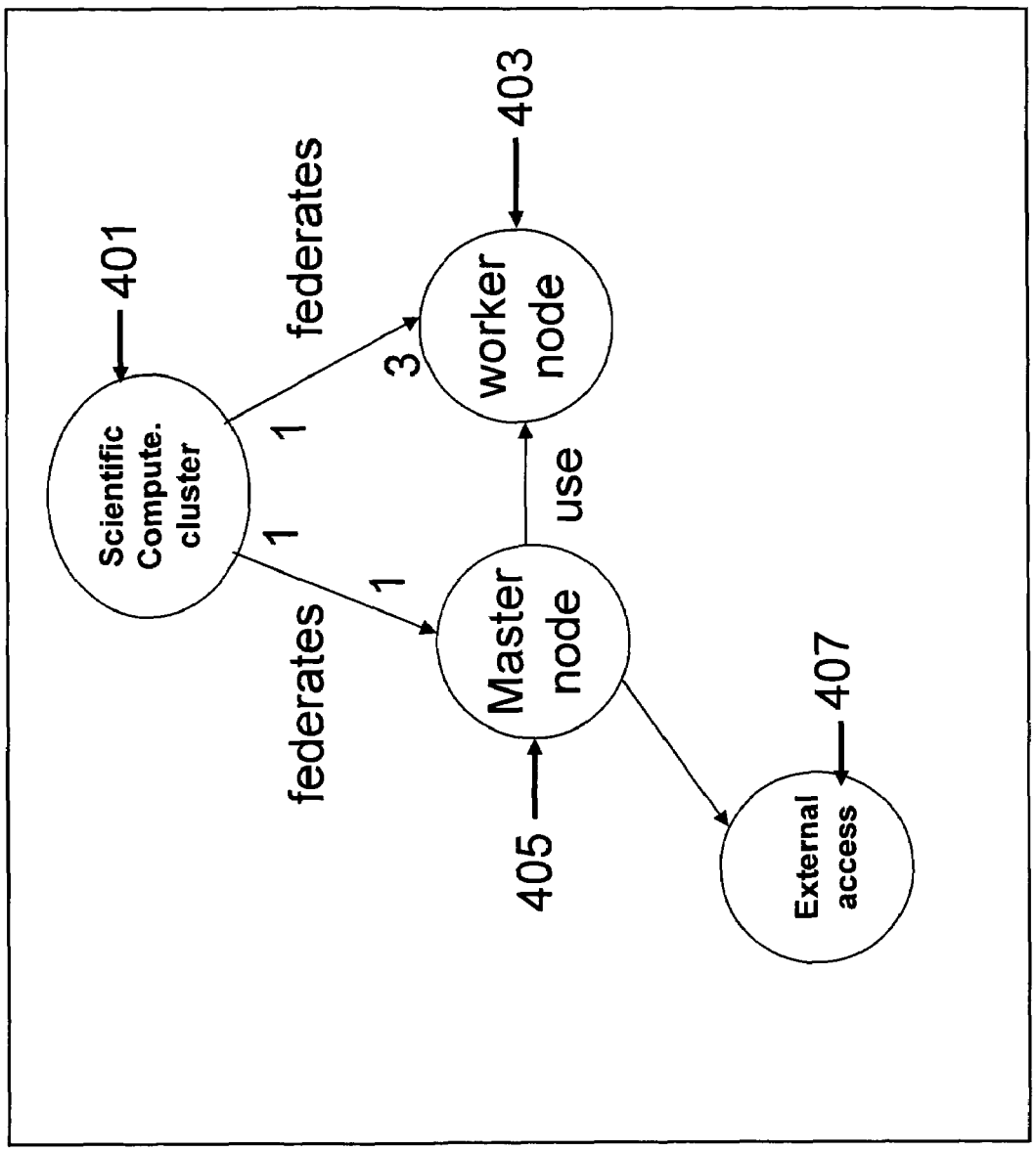
FIG. 4 An example of a Service Environment Model.

The Service Environment (SE) Model (301, in FIG. 3) is a high level description of a set of requirements on a desired state of a service environment, independent of infrastructure. For example, it may describe a high throughput computing cluster. The description may include required components, properties, and behavior. It may describe a set of resources, properties, and relationships that must exist for the service environment to function. FIG. 4 is an example of an SE Model for a scientific computing cluster service. The service includes resources of two types; a master node and a set of worker nodes. The worker nodes are used to perform scientific computations, while the master node controls the computation and in particular distributes the work between the workers and collects the results. Users should have access to the master node. Node 401 represents the service environment itself. It has a federates relationship with a single master node 405 and 3 worker nodes 403 as indicated by the multiplicity on the arrows. The interdependency between the master and workers is expressed by the uses relationship between the corresponding nodes. Node 407 describes a property of the master node; it must be accessible to external users.

Figure 5:
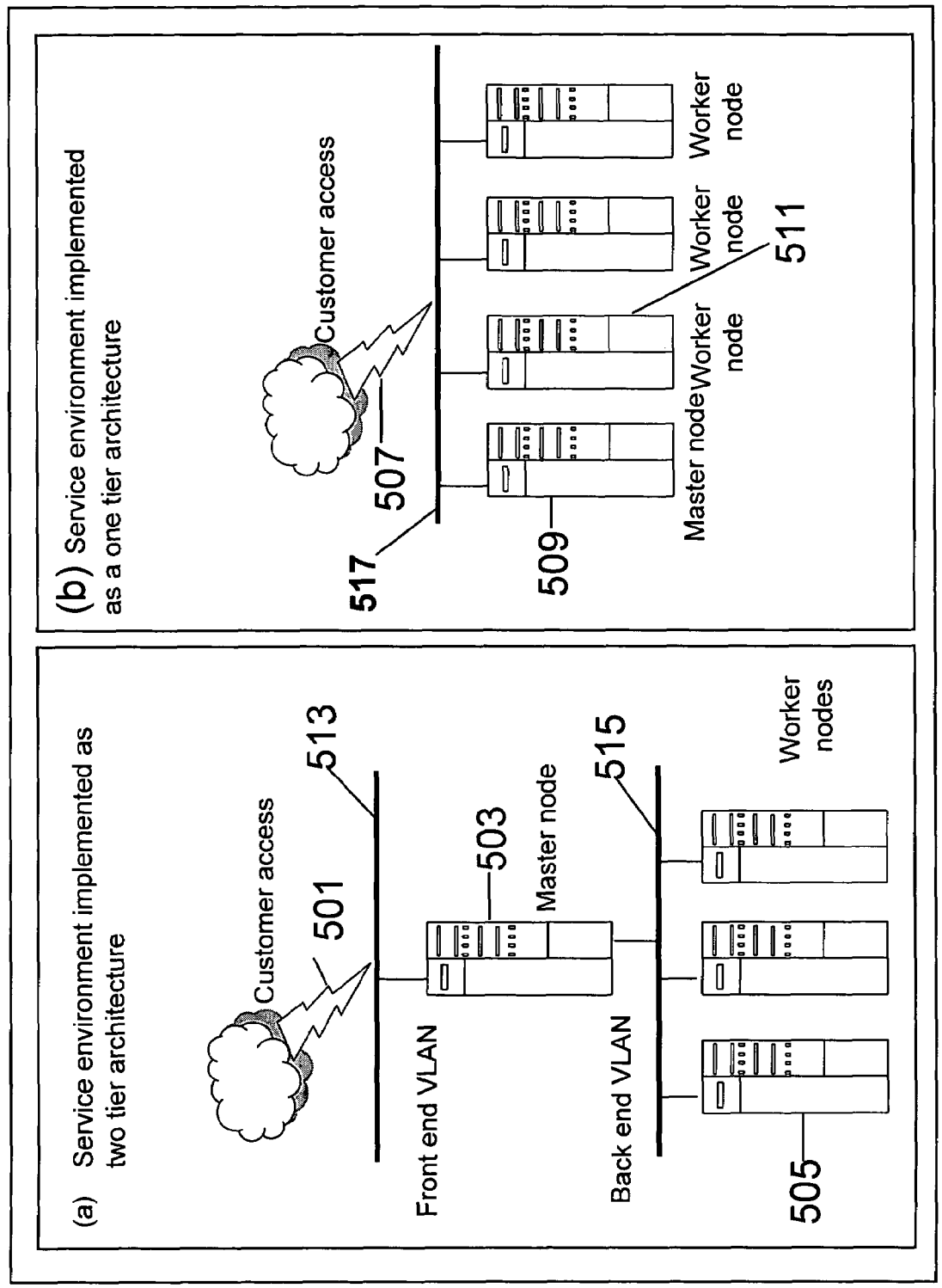
FIG. 5 An example of two possible service environment implementations.

Because the Service Environment Model is infrastructure independent, it is a partial specification. That is, it does not fully describe how the service environment will be implemented on an infrastructure. There may be degrees of freedom in the description that allow the service environment to be realized in different ways using different sets of resources or even different infrastructures. FIG. 5 shows an example of two possible implementations of the scientific computing cluster service from FIG. 4. In FIG. 5a, the infrastructure is able to support a two-tiered network organization including a front end VLAN 513, and a back end VLAN 515. The master node 503 of the cluster serves as a front end to the worker nodes 505; it is connected to both front end and back end VLANs. Only the master node is accessible to the customer (501). This organization requires, for example, a master node with two network adapters. FIG. 5b shows an implementation of the cluster as a single tier. In it, the master node 509 and the worker nodes 511 are connected to a single front end VLAN 517. In this implementation, all the nodes are accessible to the customer 507. In this implementation only a single network adapter is required in each node in the cluster.

In an infrastructure that supports both network architectures, the SE Model described in FIG. 4 may be implemented either as a one- or two-tier structure. In this case, the DPE may choose one of the architectures based on other criteria. For example, if at a certain point in time only servers with one network adapter are available, then the one-tier architecture would be chosen.

The Infrastructure Model

Figure 6:
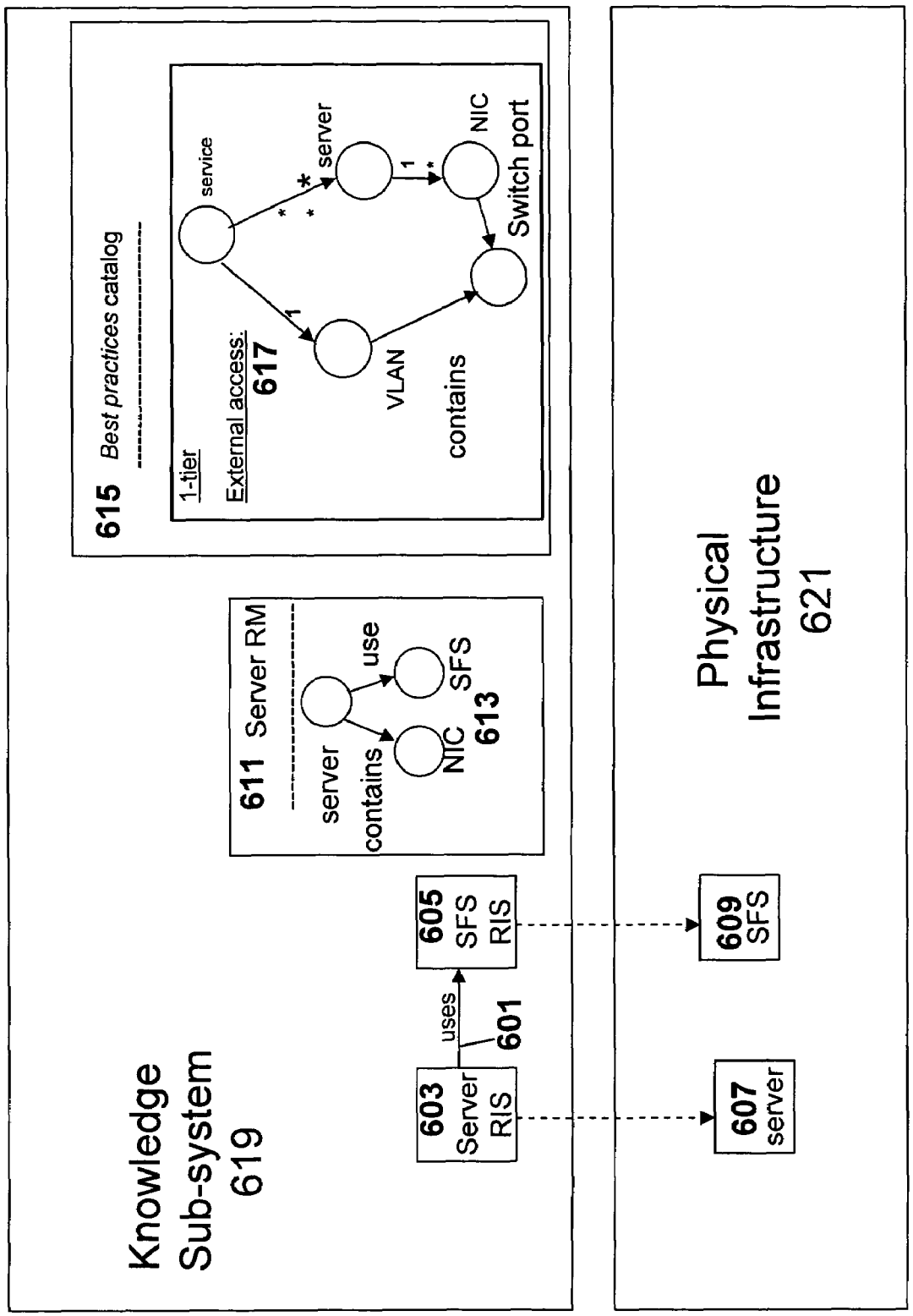
FIG. 6 Knowledge that is a part of the Infrastructure Model and the entities in the knowledge; subsystem in which it is encapsulated.

An Infrastructure Model (303, in FIG. 3) describes the resources and the organization of resources in the service provider's infrastructure. It includes the resource types and capabilities and information on physical connectivity, such as the number of network adapters and the position of firewalls. Note that an Infrastructure Model need not exist as a single static entity. In the preferred embodiment the Infrastructure Model is encapsulated and distributed among entities of the knowledge subsystem, such as RMs and RISs. In order to obtain parts of the Infrastructure Model necessary for its function the DPE may query entities of the knowledge subsystem. FIG. 6 describes knowledge seen as part of the Infrastructure Model and the way it might be distributed among knowledge subsystem entities. In the knowledge subsystem (619) RISs 603 and 605 represent resource instances 607 and 609, respectively. Relationships between RISs represent operational dependencies between the corresponding resources. For example, the relationship 601 of type uses between RIS 603 representing server 607 and RIS 605 representing shared file system (SFS) 609 indicates that the server 607 uses the shared file system 609. A RIS can be queried for its set of relationships, as well as for values of configuration attributes of the resource it represents. RMs manage collections of resources of the same type. An RM can be queried to obtain information about the collection, and to obtain information on a type level. For example, server RM 611 encapsulates a server type model 613 that can be queried for possible relationships of a server resource to other resources. The set of possible server relationships will include the aforementioned uses relationship between a server and a shared file system, as well as other relationships that the server may have. The Infrastructure Model also includes information on infrastructure constraints and capabilities. Infrastructure constraints can be expressed using rules, assertions or other mechanisms. We also use attributes on relationships (on a type or instance basis) to express constraints.

Following are some mechanisms that can be used to describe such infrastructure constraints. A fixed attribute on a relationship expresses that the relationship between the two corresponding resources cannot be changed by a provisioning action. For example, in a wire-and-forget environment, where resources are wired exactly once to a set of switches, and the wiring cannot be changed, a connects relationship between a Network Interface Card (NIC) and a Switch Port (SP) will have the fixed attribute.

Another mechanism that can be used to express constraints and capabilities of the infrastructure, as well as best practices that the service provider wishes to enforce is the best practices catalog (615). It includes a set of patterns that formally represent best practices for constructing service environments over the infrastructure. Patterns are defined once by an infrastructure expert and are used by the DPE in the Front End Generation process to transform an Service Environment Model to a Concrete Model. A pattern may be represented as a graph structure, where a node may represent a resource type or a place holder that can be replaced by a sub-topology that includes a set of nodes and relationships. Patterns may be annotated with attributes such as SECURE to indicate the properties that the pattern supports. Patterns may also include mapping rules from abstract to concrete resources. External mechanisms to generate such mappings may also be incorporated, for example we can use a third party mechanism that expresses dependencies that an application has.

In FIG. 6, pattern 617 represents the structure of a 1-tier network architecture. In this pattern a service node represents any service (e.g., a scientific computation cluster service, or an e-commerce service). The server node represents any server (e.g., the master node or the worker node from FIG. 4). The same idea can be used to define a 2-tier pattern, or any n-tier pattern. The DPE uses such patterns in the Front End Generation stage when the SE model is refined based on infrastructure knowledge to create a Concrete Model.

The Concrete Model

The Concrete Model (305 in FIG. 3) is the output of the DPE's Front End Generation stage and the input to the Back End Generation stage. It is constructed by refining the Service Environment Model using the Infrastructure Model, therefore every resource structure that satisfies the requirements in the Concrete Model also satisfies the requirements expressed in the Service Environment Model. The goal of the Back End Generation stage is to generate such resource structure on the computing utility infrastructure. The refinement process uses the Infrastructure Model to ensure that the resulting Concrete Model is indeed implementable on the computing utility infrastructure.

The Concrete Model declaratively describes a structure of a set of resources that are associated with the service environment. More specifically, in a Concrete Model nodes represent resources, and requirements on the state of these resources. Edges represent relationships between resources. Every edge is associated with a list of attributes that describes the nature of the relationship. A node may contain a set of constraints on values of attributes of the resource that it represents. The values of some of these attributes are fixed, namely, they cannot be changed in a resource. Therefore, the constraints on these attributes are used as selection criteria for a resource that will serve the role of this node in the final resource structure that implements the Concrete Model in the end of the provisioning process.

As in the Infrastructure Model, relationships between nodes in the Concrete Model may be fixed or dynamic; a fixed relationship cannot be changed; they reflect fixed infrastructure structures and operational constraints. Thus, such relationships must be taken into account in the selection of the resources. For example, if a Concrete Model contains a server node with a fixed contains relationship with three NICs then only a server with (at least) three NICs can be selected for this node. A dynamic relationship can be established by invoking a low level automation procedure on one (or more) of the knowledge subsystem entities. For example a dynamic connects relationship may be established between switch port and VLAN resources by programmatically configuring switches or routers.

In an advantageous embodiment, an edge, representing a relationship, is associated with a set of attributes that describe the nature of the relationship. Attributes describe the type of relationship (e.g., federates), and whether it is fixed or dynamic. A color attribute with value green denotes that the relationship must exist between the corresponding resources. The same attribute with value red denotes that the relationship must not exist between the corresponding resources.

While the Concrete Model shares many similarities with the Service Environment Model, there is one property that the Concrete Model should satisfy; it should be mappable onto the knowledge subsystem. More specifically, every node in the Concrete Model that represents a resource has to be mappable, either directly or indirectly, to either an RM or an RIS. Every relationship has to be mappable to an automation procedure to establish it (or un-establish it). The meaning of this property is that all of the high level concepts that were part of the Service Environment Model are now refined to a structure that is implementable using the knowledge subsystem. The most common case is that a node representing a resource is mapped to a RM for this type of resource. The mapping might be indirect; if one resource, say a server, has a fixed contains relationship with a different resource, say a NIC, then only the server node in the Concrete Model needs to be mappable to a server RM. In the Back End Generation stage, a server RIS can be obtained from the server RM, and a NIC RIS can then be obtained from the server RIS. Note that the NIC is represented in the server type model encapsulated by the server RM. This condition will be further explained when discussing the operation of the DPE. If only parts of the Concrete Model can be mapped to the knowledge subsystem then the method of the invention can still be applied to create a resource structure that matches in parts with the Concrete Model.

Figure 7:
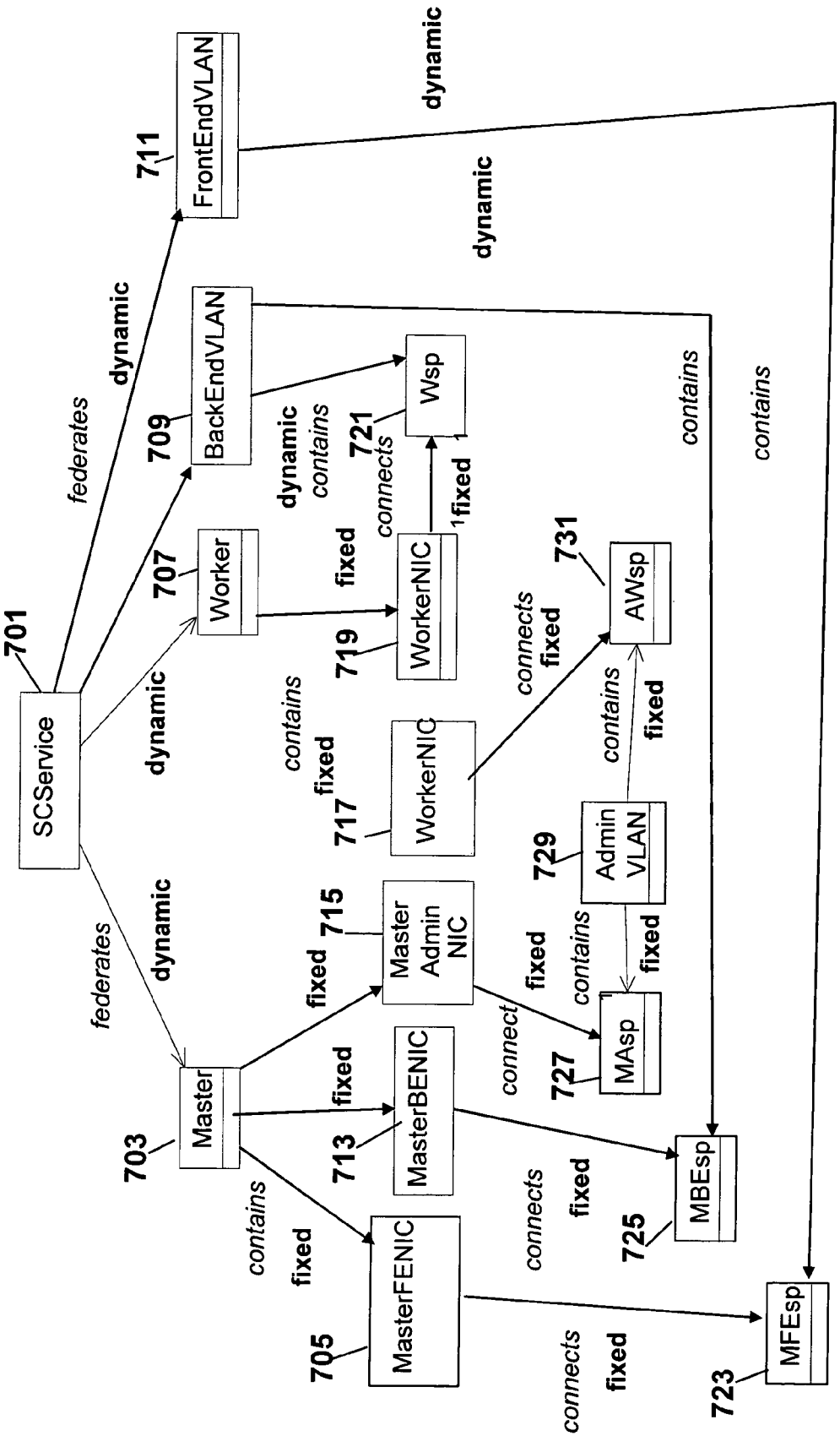
FIG. 7 An example of a Concrete Model.
Figure 8:
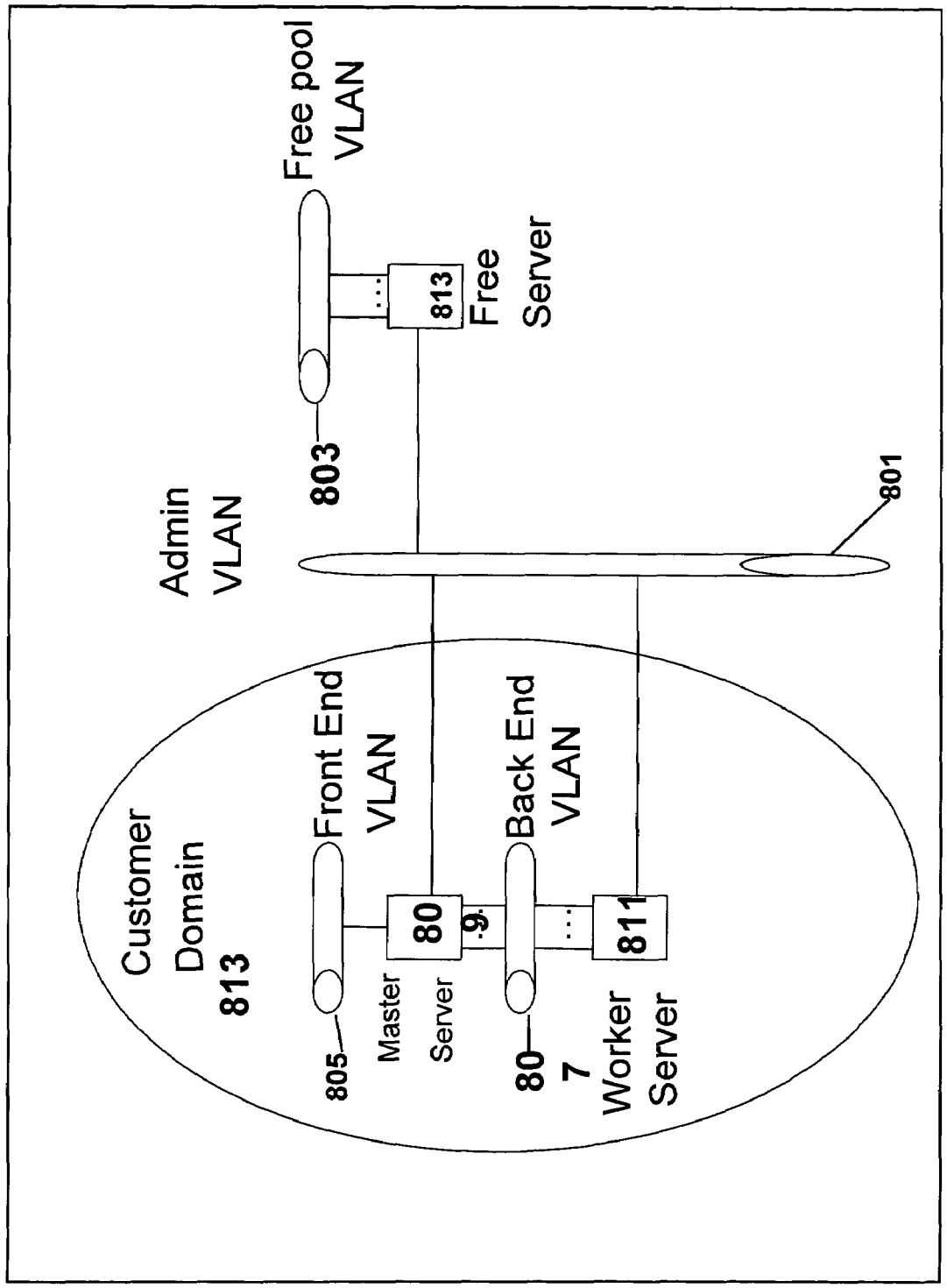
FIG. 8 An example of a system structure with a scientific computing cluster service environment.

FIG. 7 shows an example of a Concrete Model for a scientific computing cluster service that corresponds to the system described in FIG. 8. In this system every server (depicted in FIG. 8 as a box) is connected to a designated Admin VLAN 801. A free server 813 has all of its other NICs connected to a designated Free-pool VLAN 803. A service environment 813, is a scientific computing cluster environment which includes a single master server 809, connected to both a front end VLAN 805 and a back end VLAN 807, and a set of worker servers connected to the back end VLAN. Both Master and Worker servers are also connected to the Admin VLAN. This environment is a modification of that in FIG. 5a that includes an administrative VLAN.

In FIG. 7, the root node 701 is an object that represents the service environment itself; it federates four resources: a master node 703, a set of zero or more worker nodes 707, a front end VLAN 711, and a back end VLAN 709. The master node contains three network adapters (NICs): one 715 connecting it through a switch port 727 to the Admin VLAN 729, one 705 connecting it through a switch port 723 to the front end VLAN 711, and one 713 connecting it through a switch port 725 to the back end VLAN 709. The worker node contains two network adapters: one 717 connecting it through a switch port 731 to the Admin VLAN, and one 719 connecting it through a switch port 721 to the back end VLAN. VLANs group switch ports; Each VLAN is represented by a node which contains one or more switch ports.

The relationships between NICs and the servers and the NICs and the switch ports are fixed relationships. They are defined when the example infrastructure is set up and this physical connection is considered to be permanent. Such is also the case for the contains relationship between the Admin NIC and a set of switch ports, as the servers in this example are to remain permanently connected to the Admin VLAN. The dynamic relationships need to be established by the DPE after the resources, represented by the nodes in the Concrete Model, are selected. An example of a dynamic relationship is the relationship between the Back End VLAN 709 and the switch ports that it contains (725 and 721). This relationship is established by programmatically reconfiguring the switches. The DPE in the Back End Generation phase identifies such tasks and invokes the corresponding procedures in the knowledge subsystem to carry them out.

DPE Operation

Figure 9:
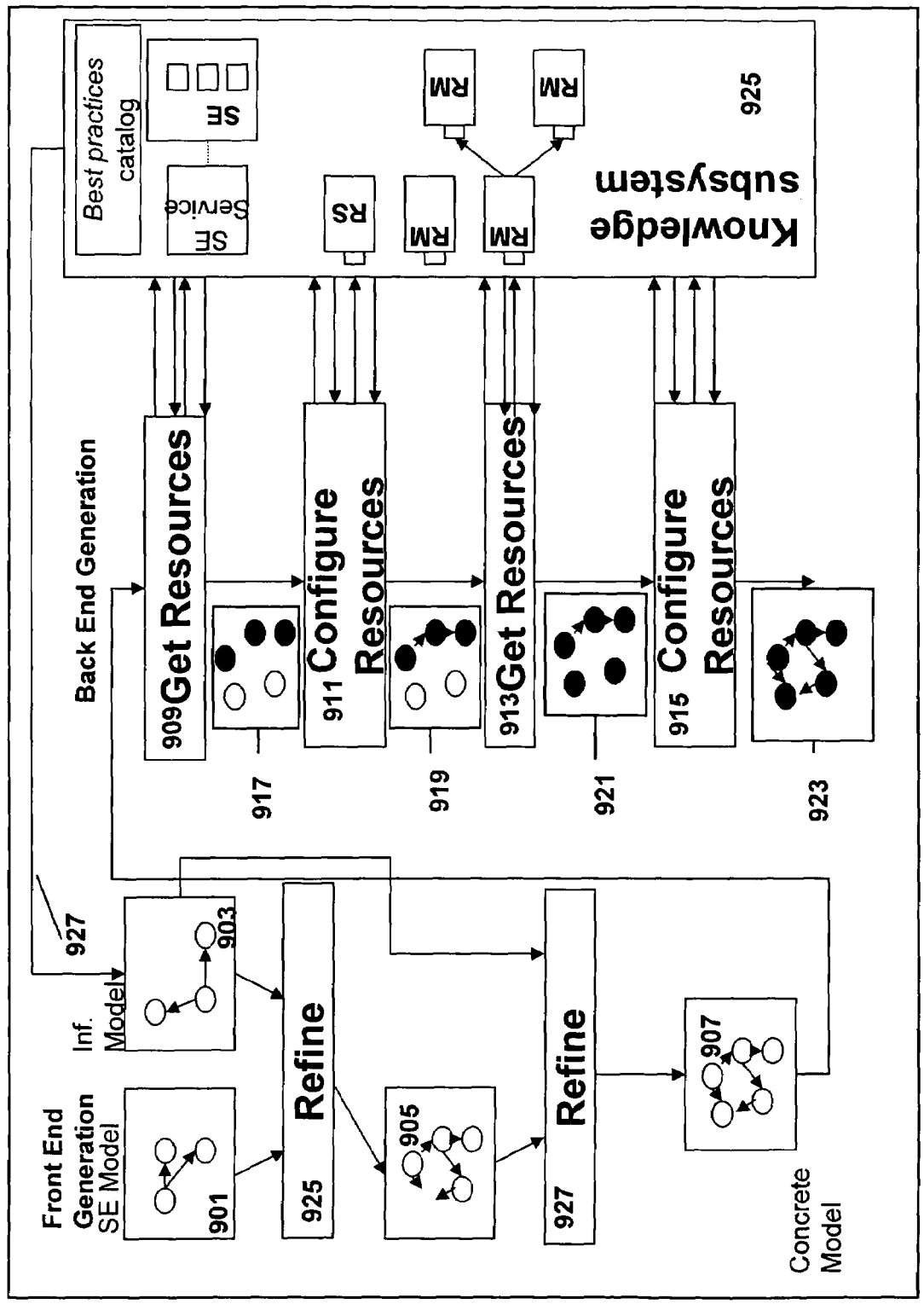
FIG. 9 An example of an execution of Dynamic Provisioning Engine which shows the Front End Generation and Back End Generation in details.

FIG. 9 is an example of an execution of the DPE which illustrates in more detail the two stage process for performing provisioning based on a high level model. The input to the Front End Generation stage is an Service Environment Model 901 and an Infrastructure Model 903. The Infrastructure Model represents information encapsulated in and obtained from the knowledge subsystem 925, as arrow 927 indicates. The Front End Generation is a sequence of refinement steps to the Service Environment Model based on the Infrastructure Model. Every refinement step produces an intermediary model 905 that serves as input to the next refinement step. In this example execution there are exactly two refinement steps 925 and 927. In the general cases there may be any number of refinement steps. The result of the Front End Generation is a Concrete Model 907 which serves as input to the Back End Generation stage. In the Back End Generation stage, resources corresponding to nodes in the Concrete Model are selected or created and relationships between them are established by interacting with the RMs in the knowledge subsystem. There may be multiple phases in which resources are selected or created and then configured to establish the corresponding relationships. In this example, after step 909 three resources are selected; the corresponding nodes are shown in black 917. In step 911 two relationships between the selected resources are established as depicted in 919. In step 913 the rest of the resources are selected as shown in 921. Finally, in step 915 all (dynamic) relationships between the resources are established as shown in 923. After the termination of the Back End Generation, a structure matching the Concrete Model structure is created in the knowledge subsystem. Here after we describe both stages in more details.

Front End Generation

In the Front End Generation stage, a Service Environment Model is refined based on an Infrastructure Model to produce a Concrete Model. The Front End Generation is an iterative process where every iteration further refines the intermediary model that is the result of the previous iteration. In every iteration, a node in the model is selected and is replaced by a subgraph structure which contains a set of nodes and edges. To refine a node entities in the knowledge subsystem, and in particular the best practices catalog, are consulted. Several structures in the best practices catalog are used. Following are some examples:

The best practices catalog may contain a description of direct mapping from a node to a sub-graph structure that refines it. For example, the best practices catalog may contain a mapping from a single Web server node to a topology (sub-graph) that contains a server node and an Apache software node, and a hosts relationship from the server node to the Apache software node. Suppose that the DPE in the Front End Generation stage receives as an input a Concrete Model that contains a Web server node. Once this node is selected, by consulting with the best practices catalog, the DPE will replace the node with the aforementioned sub-graph.

The best practices catalog may contain patterns (a pattern is a representation of a family of sub-graphs) that correspond to high level concepts such as SECURE, or, 1-tier, 2-tier, or, n-tier. A node in an input model which describes a property, such as SECURE, once selected, may be matched with a pattern annotated with a matching attribute. Consequently, The Front End Generation will merge the pattern with the input model.

As an example, consider the Service Environment Model in FIG. 4, and the 1-tier template 617 in FIG. 6. Note that the keyword "external access" annotates the template 617. Consequently, when node 407 in FIG. 4 is selected in the Front End Generation stage, it will be matched with pattern 617. The DPE will merge the two to produce the result described in FIG. 10A.

Figure 10:
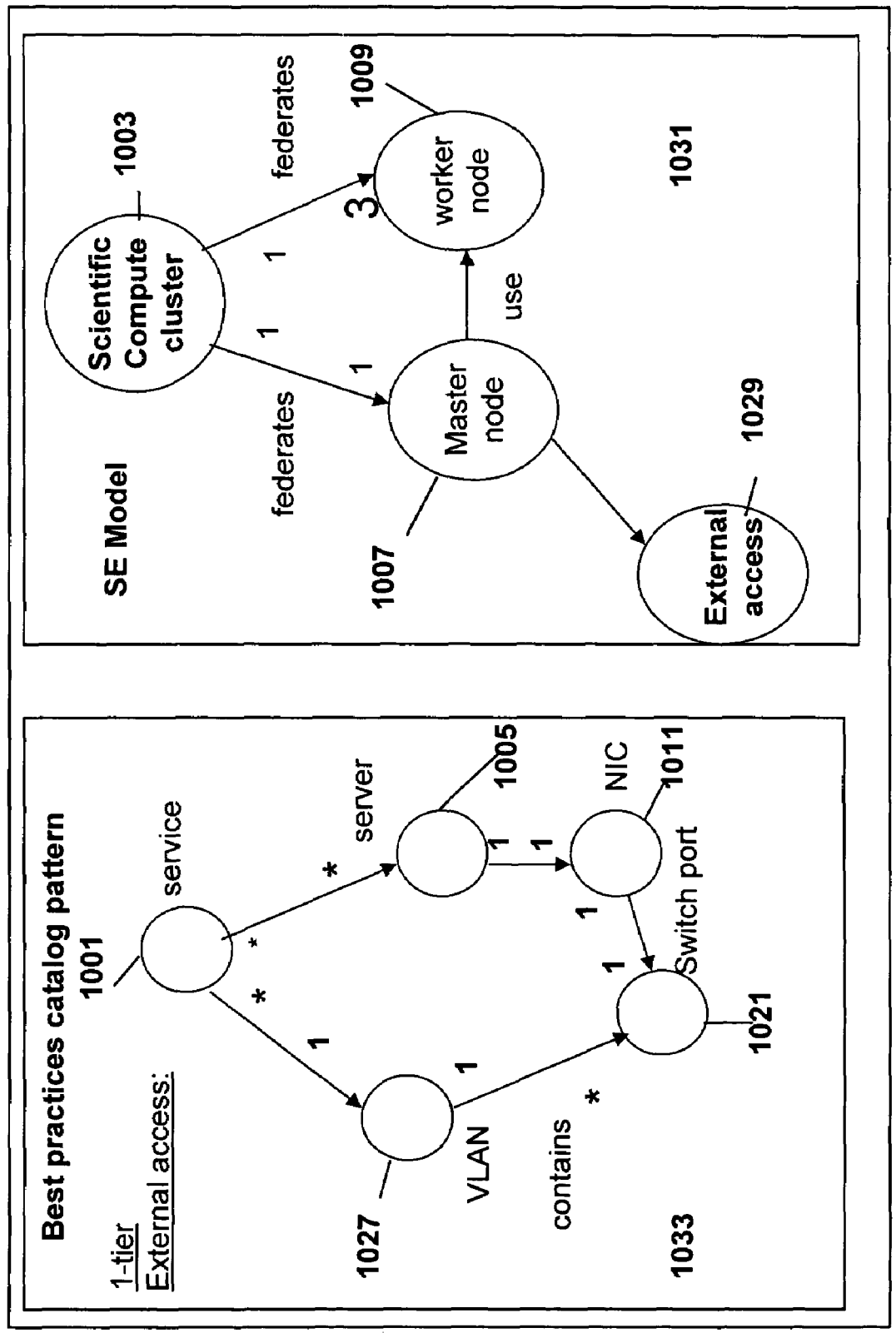
FIG. 10 and FIG. 10A Merging of a Service Environment Model and a 1-tier best practices catalog template FIG. 11 The Front End Generation process.
Figure 10A:
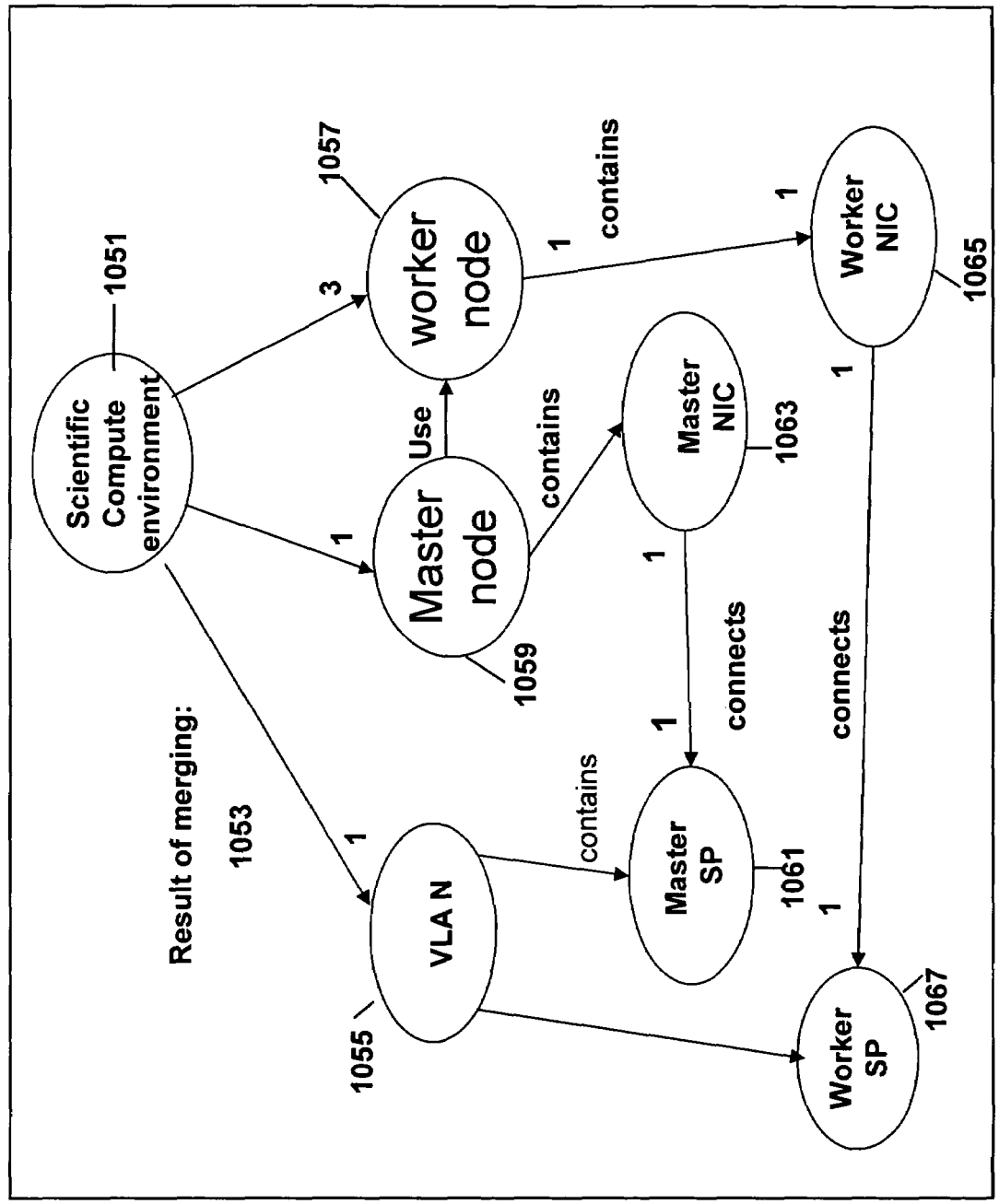

FIG. 10 and FIG. 10A describes the merging; for convenience, the Service Environment Model and the 1-tier pattern are shown again in FIG. 10 (1031, and 1033, correspondingly). The result of the merging is shown in FIG. 10A. First, the generic service node 1001 is replaced by the scientific compute cluster node 1003, which represents a specific service, resulting in node 1051 in the output model. Next, the generic server node 1005 in the pattern is replaced by two nodes, the Master node 1007 and the Worker node 1009, which both represent servers in specific roles, resulting in nodes 1059 and 1057 in the output model. The reasoning is that the generic server node in the pattern represents requirements on all the servers in the environment. Thus, both the Master server and the Worker server must satisfy these requirements. Note that in the pattern the multiplicity of a server is star which means "any number". The Service Environment Model is more concrete in specifying the number of worker servers (three) and the number of master servers (one). Thus, three and one are used as the multiplicity of the corresponding nodes in the resulting graph 1053. The result satisfies and refines both models. Since there is a 1-1 contains relationship between a server and a NIC in the pattern, the NIC node 1011 in the pattern is transformed to two nodes 1063, and 1065 in the resulting output model, one for the Master server node and one for the Worker server node. Note that, as the Worker node 1017 actually represents three servers, Worker NIC 1065 represent three NICs, each contained in a different server. Using the same reasoning, the switch port node 1021 is transformed to a Worker switch port node 1067 and a Master Switch Port node 1061. In the 1-tier pattern all of the Switch ports, represented as a single node 1021, are contained in a single VLAN 1027. Thus, the VLAN node 1055 is added to the resulting topology and both the Master SP node and the Worker SP node are contained in it. The only node which disappeared from the Service Environment Model in this transition is the node 1029 ("External Access") which represents a concept that is implemented by the 1-tier pattern.

The best practices catalog may also include an external (generally a third party) refinement mechanism in order to dynamically generate sub graph patterns. Instead of mapping a node to a pattern, the node is mapped to a reference to an external procedure that can be a part of any external system. In the refinement process, when such node is selected, the reference is followed and the external procedure is executed. The result is a sub-topology that replaces the selected node.

As described above, the refinement uses well known graph substitution and merging techniques for each refinement step. The process halts when no more refinements can be made, or when no more refinement is needed for the resulting model to be sufficiently mappable to the knowledge plane. At this stage, it must be possible to map nodes to knowledge subsystem entities (RMs and RISs).

We say that a Concrete Model is mappable to a knowledge subsystem if all of the nodes representing resource roles are mappable directly or indirectly to a knowledge subsystem entity (RM or RIS). The termination condition of the Front End Generation process is that no more refinement on any node can be performed. At this state if resulting Concrete Model is mappable to the knowledge subsystem then the process can continue to the Back End Generation, otherwise the process fails since the service cannot be implemented on the infrastructure at hand. An extension of this algorithm, clear to any one who is familiar with the art, continues with the Back End Generation process even if the Concrete Model is only partially mappable to the knowledge subsystem. In this case the end result of the entire DPE process may only partially satisfy the requirements in the Service Environment Model.

Figure 11:
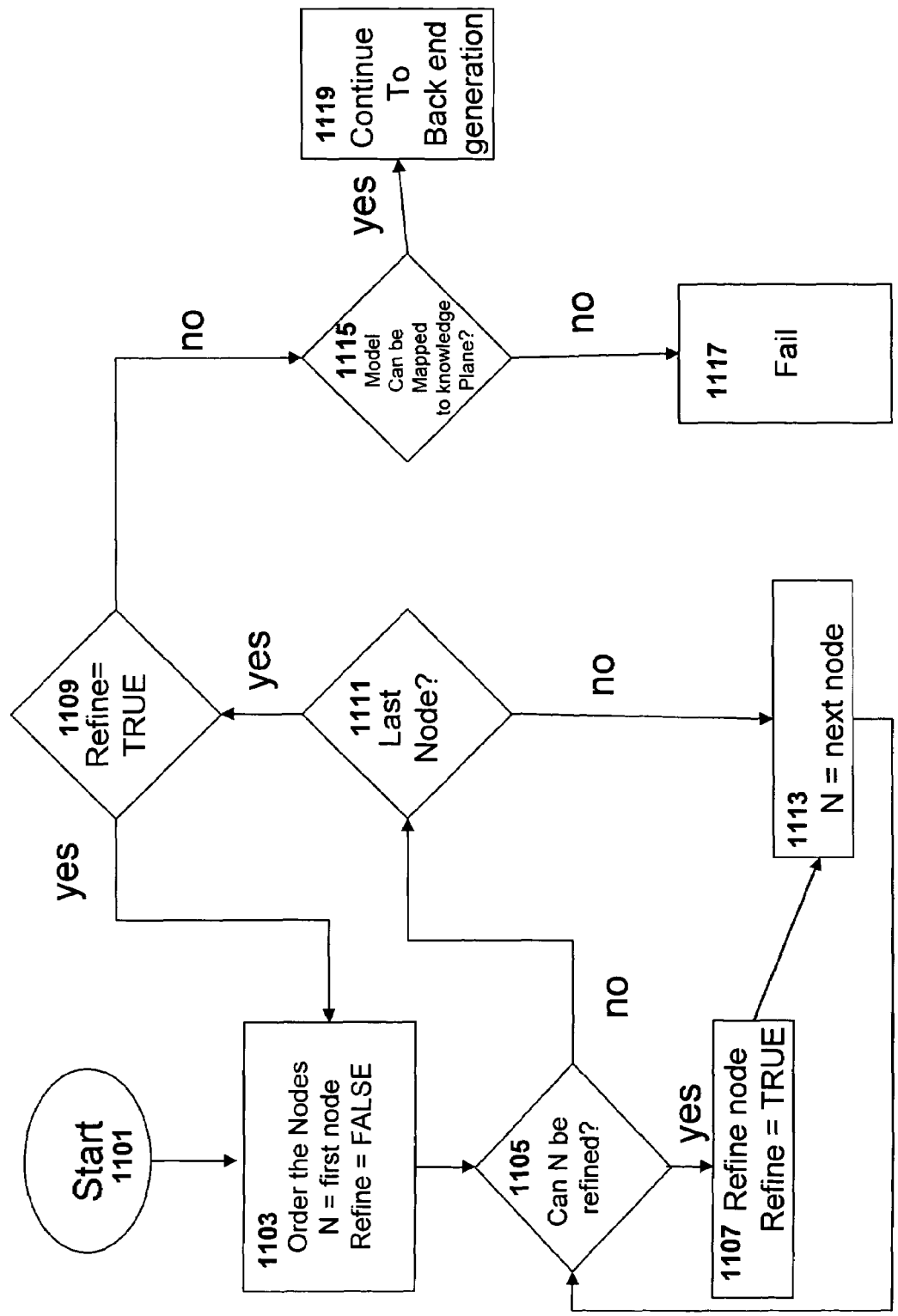

FIG. 11 is a diagram that describes the Front End Generation process. The process starts at 1101. It proceeds to step 1103 which is the first step in a single refinement iteration. In this step the nodes are ordered, and the first node is selected and a Boolean variable refine is set to the value false. Step 1105 determines if the selected node can be refined. If so, the process continues to 1107 where the selected node is refined and a Boolean variable refine is set to true. Otherwise, the process continues to step 1111. Step 1111 determines if the selected node was the last node or not. If not, the next node is selected at step 1113. The process then returns to step 1105 to continue refinement. If the node was the last node, the process continues to step 1109. At step 1109, the value of the variable refine is checked. The refine variable indicates if there was a node that was refined in the course of a single iteration. If the iteration did not refine any node then the refinement process exits to step 1115. In this case, no more refinement can be performed on any node. Otherwise, a new iteration is started by returning to step 1103. When the iterative refinement process stops, it is checked whether the Concrete Model is mappable to the knowledge subsystem at step 1115. Accordingly, the process fails in 1117, or proceeds to the Back End Generation in 1119.

Back End Generation

In the second stage, the DPE generates and executes provisioning actions to create a resource structure that matches the Concrete Model and satisfies the requirements described in the Service Environment Model. A provisioning action sequence contains two types of provisioning actions: an action to select a resource, and an action to configure a resource or relationship. Usually a sequence corresponding to a single request will contain multiple sub-sequences, termed phases, in which resources are selected and then configured. The number of phases depends on the complexity of the problem.

Figure 12:
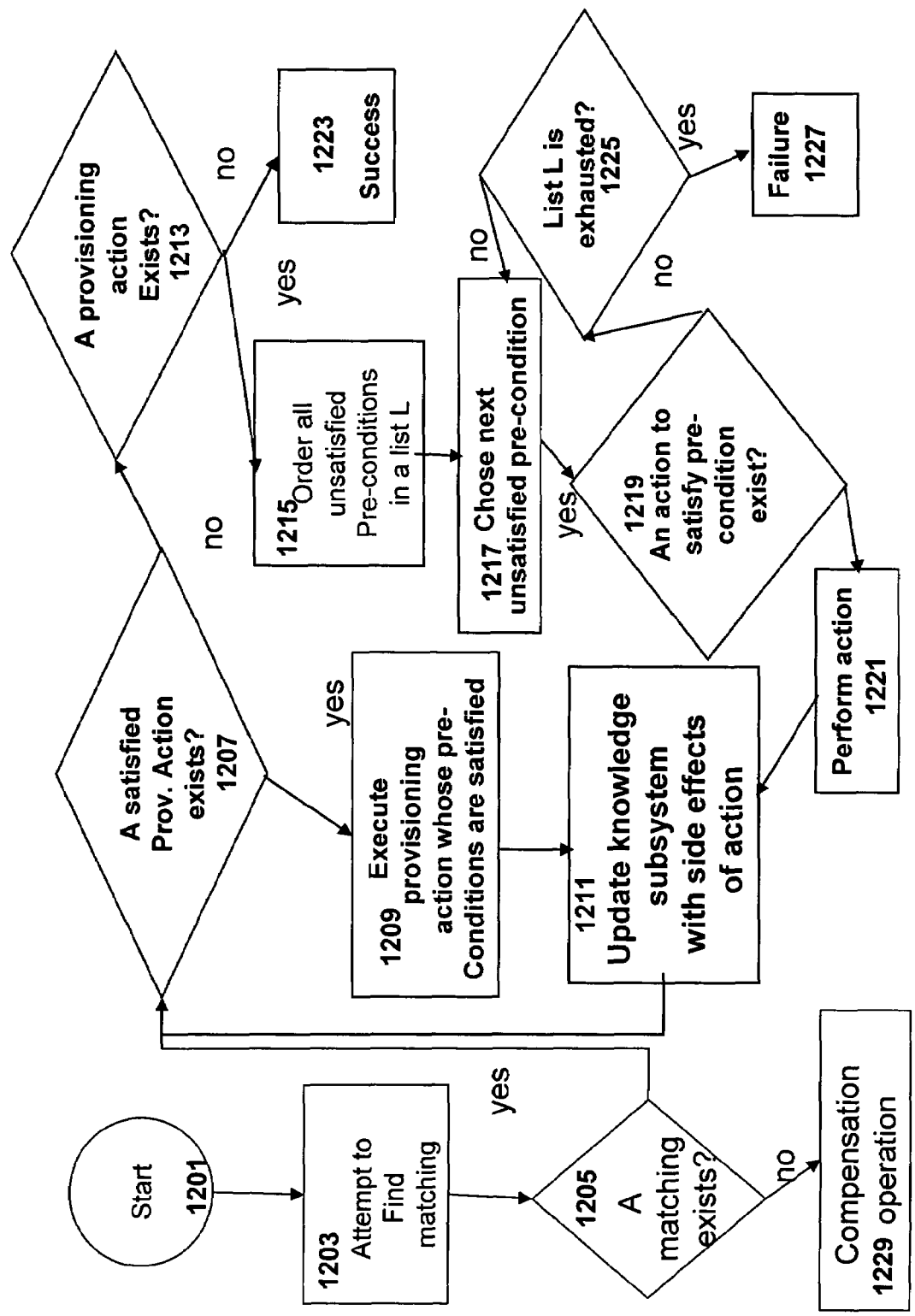
FIG. 12 The Back End Generation process.

A single phase of the Back End Generation process is described in FIG. 12. Essentially, in a single phase, starting in step 1201, a subset of the resources are selected and mapped to nodes in the Concrete Model (1203). This matching defines a set of provisioning actions of two types: a provisioning action to configure a resource, and a provisioning action to establish or un-establish a dynamic relationship. A provisioning action may have preconditions. A provisioning action can be executed only if its preconditions are satisfied. In step 1209 a provisioning action whose preconditions are satisfied is executed. An execution of a provisioning action may have side effects in the physical infrastructure. In step 1211 these side effects are reflected back in the knowledge subsystem by creating or destroying the corresponding relationships or changing the values of attributes in the corresponding Resource Instance Services.

If all provisioning actions are executed successfully (1213) then the current phase of the Back End Generation process terminates successfully (1223). If all nodes of the Concrete Model were matched in this or previous phases then the Back End Provisioning process terminates successfully and the entire structure described in the Concrete Model is now built in the physical infrastructure and reflected in the knowledge subsystem. Otherwise, another phase is performed.

In some case, a provisioning action whose preconditions are not satisfied exists (1213). In this case, an action to satisfy an unsatisfied precondition is executed (1221). As in the previous case, side effects need to be reflected in the knowledge subsystem (1211). If actions exist whose preconditions are not satisfied, and there do not exist any precondition that can be satisfied by executing an action (1219 and 1225) then the process fails (1227).

We now describe some aspects of the Back End Generation in more detail. In the matching step 1203, selection of resources is based on two conditions: when a node is matched with a corresponding Resource Instance Service, the values of fixed attributes as defined in the Resource Instance Service must satisfy constraints on these attributes defined in the node. In addition, all edges that represent fixed relationships with the node as an endpoint in the Concrete Model must match the set of fixed relationships of the matching Resource Instance Service in terms of type of relationship, direction of relationships, and matching endpoint nodes. More specifically, if a node A in the concrete model is connected by an edge to a node B in the concrete model and annotates with type x then there has to be a relationship of type x between the Resource Instance Service A' that is matched with the node A and the Resource Instance Service B' that is matched with the node B, moreover the direction of the relationship should be identical to the direction of the aforementioned edge. The matching algorithm works by interacting with the RMs. For every node, an operation is executed on the corresponding RM to find and obtain a set of Resources Instance Services that are potential match for the node. The RMs may accept some selection criteria (in the form of constraints over values of attributes) which are defined in the node and passed as parameters to a find operation. These selection criteria only serve for the initial filtering. Additional filtering must be done by the DPE so that the matching condition defined above is satisfied. The matching is intricate since when selecting a resource (represented by a Resource Instance Service) it is not enough to look only at its immediate fixed relationships; a selection of a resource may dictate selection of a different resource (with whom it has a relationship) so the latter one must also have the correct set of fixed relationships recursively. To do the matching, the DPE employs well known graph matching techniques. These techniques backtrack and try the next possibility whenever a matching possibility fails.

Once the matching is complete, a subset of the nodes is mapped to Resource Instance Services, such that the set of fixed relationships and attributes in the Concrete Model matches the corresponding relationships and attributes in the knowledge subsystem. This includes fixed relationships between nodes that are both matched in this phase, or between nodes one of which is matched in this phase and the other was matched in previous phases. In 1203, if a nontrivial matching (i.e., matching of size greater than 0) exists, then the process proceeds to configuring the resources, starting at 1207, otherwise the process fails in 1205. A process may fail due to many reasons. For example, it may not be possible to map the pattern defined by the set of fixed relationships to the infrastructure at hand. For example, if a node representing a server has 3 fixed contains relationships with nodes representing NICs and all servers in the infrastructure have fewer than 3 NICs.

If a matching cannot be found the entire process fails (1205). Since some allocation and configuration actions may already have been performed, a compensation action needs to take place to restore the system state (1229). This is possibly done by recursively calling the DPE with a new request such that the new desired state is the original state before the current DPE process started. Alternatively, the algorithm can be easily generalized to find a non-optimal solution in which a resource structure similar but not identical to the description in the Concrete Model is found.

Once Resource Instance Services are selected and mapped to a subset of the nodes in the model, they are configured to establish the set of dynamic relationships described in the model and to change values of dynamic attributes to satisfy the constraints defined in the Concrete Model. This is done by interacting with knowledge subsystem entities that encapsulate the logic to configure the resources. Different knowledge subsystem entities may encapsulate automation procedures to establish (or un-establish) different relationships. For example, a RM for a composite resource may encapsulate the knowledge to establish all relationships between resources in the composite. The invention does not make any assumption on the architectural location of these automation procedures. It only assumes that such low level automation procedures exist, and that there exists a mapping, accessible to the DPE, between a relationship and the automation procedure to establish or un-establish it, and between an attribute and the operation to set its value. An automation procedure will typically receive as parameters the handles for resources involved and configure them to implement the semantics of the relationship or attribute. The DPE is responsible for updating the corresponding RISs with the information on the established relationship or value of attribute.

As explained above, a matching of a set of Concrete Model nodes and a set of Resource Instance Services defines a set of provisioning actions that must be executed. The set includes two types of provisioning actions: to configure a node and to establish or un-establish a relationship. Specifically, for every node in the Concrete Model, for every attribute whose value is different then the value of the attribute in the matching Resource Instance Service, a provisioning action must be performed on the Resource Instance Service to change the value of the attribute. For every edge representing a dynamic relationship in the Concrete Model, a provisioning action must be performed to establish the relationship in the knowledge subsystem if the relationship do not exist. For every red edge in the Concrete Model that represents a relationship that must not exist, if a corresponding relationship exists in the knowledge subsystem it must be un-established.

For example, a resource, say of type Web server, may have an attribute state whose value in the Concrete Model is set to started. In the knowledge subsystem the values of the state attribute may be created. An provisioning action must be performed to change the value from created to started. The process can work as follows. An operation setAttribute is invoked on the Resource Instance Service with parameters that are the name of attribute and the new value ("state", and, "started", correspondingly). This operation triggers an automation procedure which affects the physical infrastructure by starting the Web server that is represented by the Resource Instance Service. For a relationships, consider as an example a relationship of type contains between a Switch Port and a VLAN. An establishRelationship provisioning action can be invoked in the knowledge subsystem that will trigger an automation procedure that affects the physical infrastructure by programmatically configuring the switch to move the designated switch port in the designated VLAN.

Back in FIG. 12, the configuration is a 3 step process; first, in 1207 all dynamic relationships and attributes between matched resources are collected by analyzing the Concrete Model and mapped to the corresponding provisioning action, second, in 1209, a provisioning action whose preconditions are satisfied is executed. As mentioned, a provisioning action may have side effects that need to be reflected back in the knowledge subsystem. A side effect is any state change that is beyond the property that is the target for which the automation procedure was invoked. An example of a side effect of the operation to start a Webserver, described above, may be the creation of a use relationship between the Webserver and a database resource. In this case, step 1211 involves updating the knowledge subsystem with the aforementioned use relationships. Side effects may be modeled and described in an inspectable way for every operation in the knowledge subsystem that affects the physical infrastructure. The Front End Generation may collect and include information about side effects in the Concrete Model. Alternatively, they may be discovered by a different discovery component after the operation is executed. In the later case once a provisioning action is executed, the discovery component is executed and its output is used to update the knowledge subsystem in Step 1211. In some settings the users of the system may decide that some relationships are not important for the management of the system and they can be ignored all together.

Although the present invention may be employed by many types of entities, it is particularly useful for use by a service provider, an enterprise owning an infrastructure used for running at least one application, a customer of a service provider, a company owning an IT infrastructure, and a utility provider.

Thus the present invention includes an apparatus comprising means for generating a Concrete Model. The Concrete Model describes a structure of resources implementable over a computing utility infrastructure, and satisfying a set of service requirements. The step of generating comprising the steps of: means for obtaining a Service Environment Model of a service environment, where the Service Environment Model describes a new desired state of the service environment; means for getting an Infrastructure Model describing both resources and an organization of the resources in the computing utility infrastructure, the Infrastructure Model is encapsulated in a knowledge subsystem, and means for forming the Concrete Model describing a resource structure such that the Concrete Model refines the Service Environment Model and is mappable to the knowledge subsystem.

In some embodiments, the apparatus includes means for employing the Concrete Model to generate provisioning actions, the provisioning actions, when executed, create a resource structure that matches the description in the Concrete Model, the resource structure satisfies the new desired state of the service environment.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for generating a Concrete Model of a computing utility comprising the steps of:
   receiving, by a computer system, as input an infrastructure-independent Service Environment Model of a service environment, said Service Environment Model describing a set of requirements for an initial desired state of said service environment;
   receiving, by a computer system, as input an Infrastructure Model describing both hardware and software resources and an organization of said resources in the computing utility infrastructure, said Infrastructure Model representing knowledge encapsulated in a knowledge subsystem, wherein said knowledge subsystem comprises a set of objects used to represent resource instances and relationships, configure resources and relationships, query their state, and query their configuration capabilities and constraints; and
   generating, by a computer system, provisioning actions to reach a state that satisfies the set of requirements specified in the Service Environment Model, wherein the generating step comprises steps of:
   merging, by a computer system, the Service Environment Model with the Infrastructure Model to generate the Concrete Model, said Concrete Model describing a structure to implement on the computing utility infrastructure in order to reach the desired state as expressed in the Service Environment Model and being mappable to said knowledge subsystem, said generating comprising steps of:
   executing, by a computer system, a plurality of refinement steps, each refinement step comprising:
      selecting a node;
      wherein nodes represent resources and requirements on a state of the resources; and
      wherein edges represent relationships between the resources; and
      replacing the selected node with a sub graph structure to obtain an intermediary model which is an input to a subsequent refinement step;
   iteratively refining the intermediary models produced by each replacing step by repeating the steps of selecting and replacing until a resulting intermediary model is determined to be mappable to the knowledge subsystem, wherein the resulting intermediary model is determined to be mappable when every node in the resulting intermediary model that represents a resource is mappable to the knowledge subsystem;
   halting the refining when no further refinements can be made; and
   mapping the resulting intermediary model to the knowledge subsystem.

2. A method as recited in claim 1, wherein the step of receiving as input the Service Environment Model of the service environment comprises receiving a description of a set of requirements on another desired state of said service environment.

3. A method as recited in claim 1, wherein said service environment is an entity taken from a group of entities consisting of: a Web site, an on-line gaming service, a scientific computation service, an e-business service, a computing service, and any combination of these.

4. A method as recited in claim 1, implemented as an article of manufacture comprising a computer usable medium having computer readable program code means embodied therein for causing generation of a Concrete Model, the computer readable program code means in said article of manufacture comprising code for causing a computer to effect the steps of claim 1.

5. A method as recited in claim 1, wherein the step of receiving as input the Infrastructure Model comprises an action taken from a group of actions consisting of:
   querying at least one knowledge subsystem entity; querying Resource Managers, querying Resource Instance Services, querying a best practices catalog; obtaining knowledge of available resource types; obtaining knowledge of resources constraints; obtaining knowledge of resource capabilities; obtaining knowledge of infrastructure constraints; obtaining knowledge of infrastructure capabilities; obtaining knowledge of infrastructure best practices patterns; and any combination of these actions.

6. A method as recited in claim 1 wherein the step of replacing comprises at least one limitation selected from a group of limitations consisting of: querying a best practices catalog; generating sub graph patterns dynamically; employing graph matching techniques to obtain said sub-graph structure; and employing graph merging techniques to obtain said sub-graph structure.

7. A method as recited in claim 1, implemented as a program storage device readable by computer, tangibly embodying a program of instructions executable by the computer to perform method steps for generating the Concrete Model, said method steps comprising the steps of claim 1.

8. A method as recited in claim 1, further comprising using the Concrete Model to enforce a policy based service provider's best practices in implementation of Service Environments in the computing utility infrastructure.

9. A method as recited in claim 8, wherein the best practices are encoded as patterns in a best practices catalog and used in the step of generating the Concrete Model.

10. A method as recited in claim 1, further comprising employing said Concrete Model to generate provisioning actions, said provisioning actions, when executed, create a resource structure that matches the description in the Concrete Model; and
   said resource structure satisfying said set of requirements on new desired state of said service environment.

11. A method as recited in claim 10, further comprising employing said provisioning to enforce a policy based service provider's best practices in implementation of service environments in the computing utility infrastructure.

12. A method as recited in claim 11, wherein the best practices are encoded as patterns in a best practices catalog and used in the step of generating the Concrete Model.

13. A method as recited in claim 10, wherein step of provisioning includes a task taken from a group of tasks consisting of: creating a new service environment, changing the combination of resources allocated to a service environment, changing the configuration of resources allocated to a service environment, or destroying a service environment, or any combination of the above.

14. A method as recited in claim 13, wherein changing the configuration of resources allocated to a service environment comprises changing a local state of a resource or changing the way the resource is configured to work with other resources.

15. A method as recited in claim 1, wherein the method is used to regenerate provisioning instructions whenever at least one of the following occurs: infrastructure characteristics change; and requirements of a service change.

16. A method as recited in claim 15, wherein the infrastructure characteristics comprise a at least one characteristic taken from a group of characteristics consisting of: types of resources in the infrastructure; capabilities of said resources; configuration of said resources; constraints on configuration of said resources; and best practices patterns as defined in the best practices catalog.

17. A method as recited in claim 1, further comprising employing said Concrete Model to generate a Resource Manager for a composite resource, and provisioning and managing computing services in a computing utility system, based on a high level description of the characteristics and structure of desired computing services and a representation of the computing utility infrastructure used as a platform to implement the said computing services.

18. A method as recited in claim 17, wherein said Resource Manager provides a set of resource manager methods taken from a group of resource manager methods consisting of: creating composite resources based on a Concrete Model; changing composite resources based on a Concrete Model; destroying composite resources based on a Concrete Model; or any combination of these methods.

19. A method as recited in claim 1, where the step of generating a Concrete Model is performed by a user taken from a group of users consisting of: a service provider; a customer of a service provider; a company owning an IT infrastructure; and a utility provider.

20. An apparatus comprising a computer system for generating a Concrete Model, said Concrete Model describing a structure of resources implementable over a computing utility infrastructure, and satisfying a set of service requirements, said means for generating comprising the steps of:
   obtaining a Service Environment Model of a service environment, said Service Environment Model describing a desired state of said service environment;
   obtaining an Infrastructure Model describing both hardware and software resources and an organization of the resources in the computing utility infrastructure, said Infrastructure Model representing knowledge is encapsulated in a knowledge subsystem, wherein said knowledge subsystem comprises a set of objects used to represent resource instances and relationships,
   configure resources and relationships, query their state, and query their configuration capabilities and constraints; and
   generating provisioning actions to reach a state that satisfies the set of requirements specified in the Service Environment Model, wherein the generating step comprises steps of:
   merging the Service Environment Model with the Infrastructure Model to generate a Concrete Model describing a resource structure such that said Concrete Model refines the Service Environment Model and is mappable to said knowledge subsystem, said generating comprising steps of:
   executing a plurality of refinement steps, each refinement step comprising:
      selecting a node;
      wherein nodes represent resources and requirements on a state of the resources; and
      wherein edges represent relationships between the resources; and replacing the selected node with a sub graph structure to obtain an intermediary model which is an input to a subsequent refinement step;

iteratively refining the intermediary models produced by each replacing step by repeating the steps of selecting and replacing until a resulting intermediary model is determined to be mappable to the knowledge subsystem, wherein the resulting intermediary model is determined to be mappable when every node in the resulting intermediary model that represents a resource is mappable to the knowledge subsystem;

halting the refining when no further refinements can be made; and mapping the resulting intermediary model to the knowledge subsystem.

21. An apparatus as recited in claim 20, further comprising means for employing said Concrete Model to generate provisioning actions, said provisioning actions, when executed, create a resource structure that matches the description in the Concrete Model, said resource structure satisfies said desired state of said service environment.

22. An apparatus as recited in claim 20, implemented as a computer program product comprising a computer usable medium having computer readable program code means embodied therein for causing generation the Concrete Model, the computer readable program code means in said computer program product comprising code for causing a computer to effect the functions of claim 20.

23. An apparatus as recited in claim 20, further comprising means for employing said Concrete Model to generate a Resource Manager for a composite resource.

* * * * *